United States Patent Office 3,052,271
Patented Sept. 4, 1962

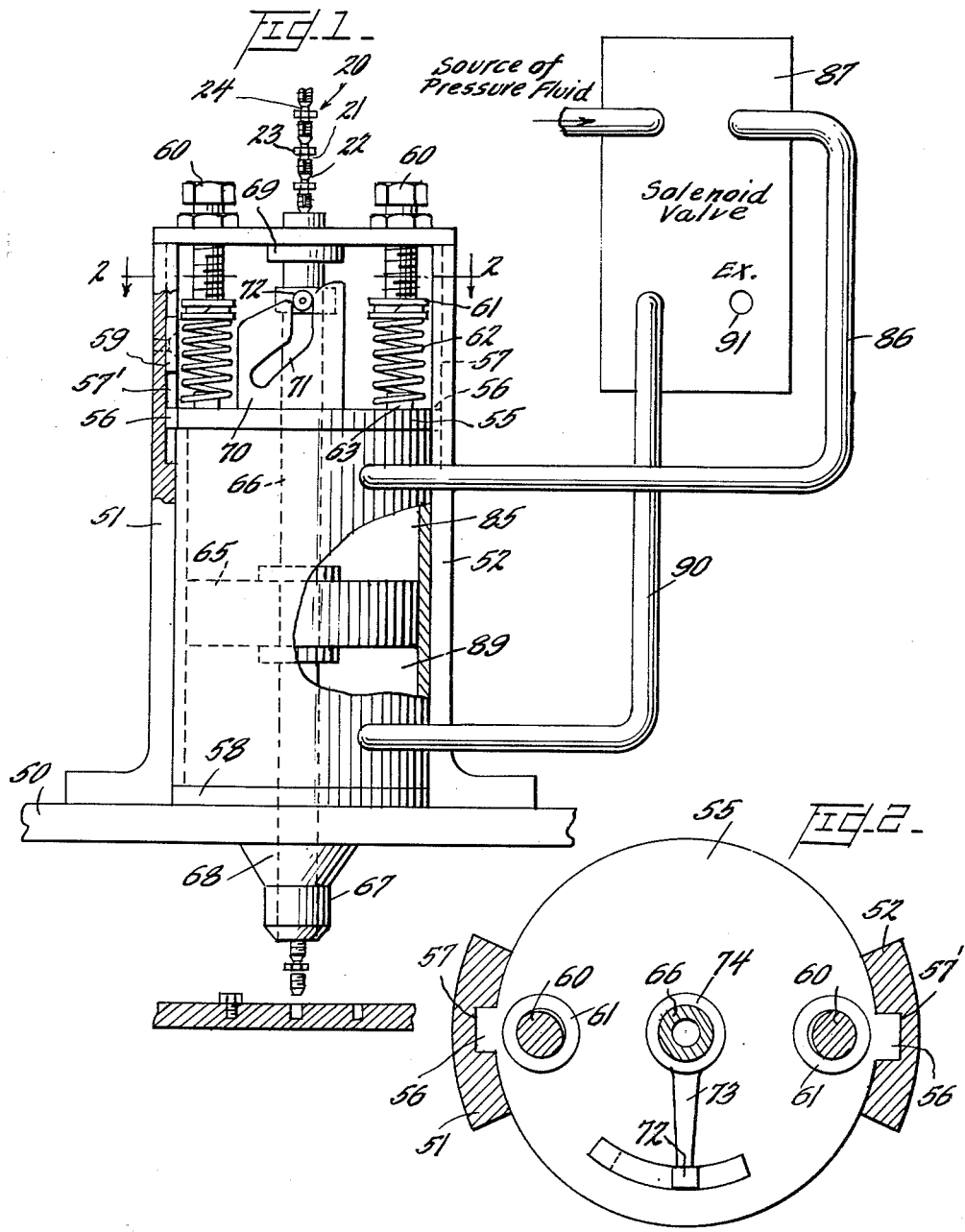

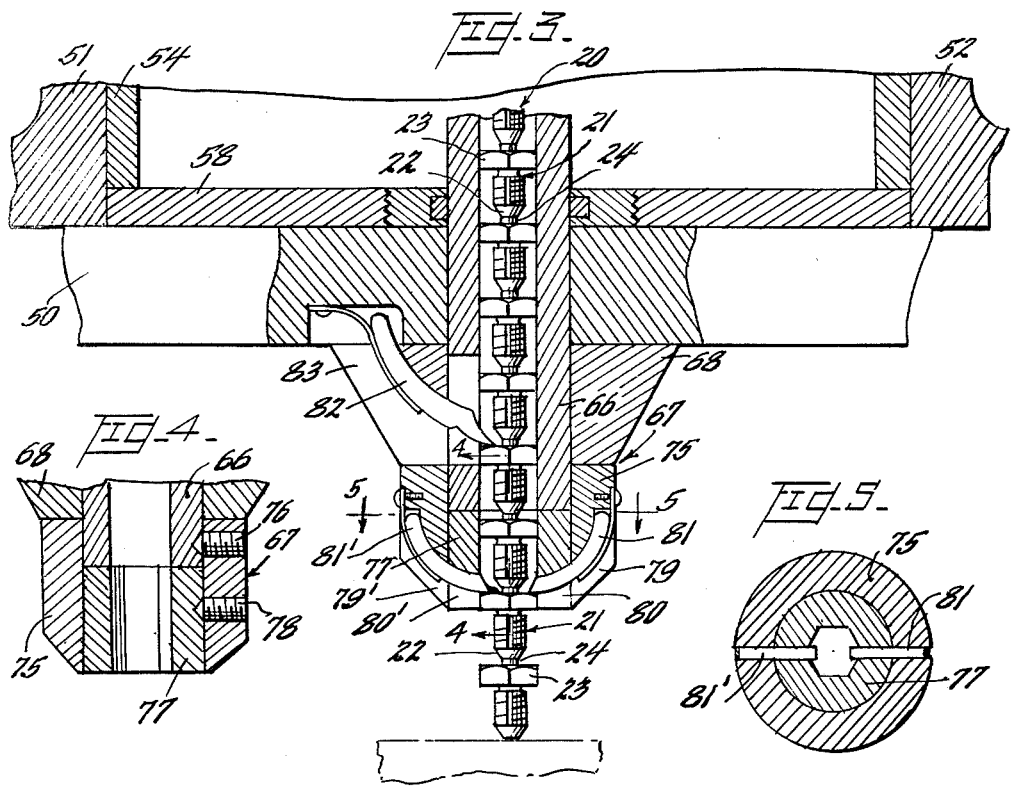

3,052,271
APPARATUS FOR APPLYING DRIVE
LINK SCREWS
Herman G. Muenchinger, Chaplin, Conn., assignor, by mesne assignments, to Noma Lites, Inc., New York, N.Y., a corporation of Delaware
Original application May 28, 1957, Ser. No. 662,258, now Patent No. 2,948,056, dated Aug. 9, 1960. Divided and this application Feb. 18, 1960, Ser. No. 9,499
5 Claims. (Cl. 144—32)

This application is a division of my copending application Serial No. 662,258, now Patent No. 2,948,056, granted August 9, 1960. The aforesaid application describes and claims a rod of recurring pattern comprising a connected string or strand of individual fasteners, and also discloses a method and apparatus for applying such fasteners. The claims of the present application are directed to such apparatus.

A connected series of individual screws, commonly known as "screw stick," and a method of applying such screws to work, are disclosed in U.S. Patents Nos. 2,247,499 and 2,286,809, respectively. Such screw sticks, and the method in question, have had considerable success in industry, particularly in applications involving the use of very small screws, which are naturally difficult to handle and apply individually. A disadvantage, however, of the screw stick and method aforesaid is that since the screws are provided with the usual helical threads, each screw unit must be applied to the work by rotating the entire screw stick through a number of revolutions equal to the number of turns of threads which are embedded in the work. This results in an unavoidable limitation of the length of a screw stick, and it has been a practice to supply the latter in lengths of only a few inches up to a foot or so.

The aforesaid copending application discloses a new type of fastener arranged in the form of an integral strand of individual fasteners fabricated from a single length of metal stock, each such fastener comprising head and shank portions, the shank of each fastener being joined to the head of the next fastener by a realtively thin neck, the shank portion of each fastener being provided with generally circumferential ridges interrupted by at least one lingitudinal flute, whereby the fasteners may be applied to the work by means of an axial movement followed by a partial rotation only. The generally circumferential ridges may take the form of an interrupted helical thread or a plurality of separate annuli, and the thread form may be conventional V-type, wedge-type, or otherwise as desired, or as required by the material into which the fasteners are to be inserted. The longitudinal flutes may vary in number and circumferential extent depending, also, upon the characteristics of the material with which the fastener is to be used. The circumferential ridges may be contiguous, or may be separated by flat shank surfaces. The head portions of the fasteners may be of any desired shape adapted to be engaged by a tool for the purpose of imparting rotary motion and also adapted to be engaged for imparting axial movement toward and into the work. That is, the peripheral outline of the head portion may be polygonal, or it may be generally circular but provided with offsets or flats to provide for the aforesaid tool engagement.

An object of the present invention is the provision of semi-automatic apparatus for applying fasteners of the character described above, such apparatus comprising a frame, a first member slidable on said frame, a second member slidable on said first member and mounted for limited rotation relative thereto, means carried by the second member for non-rotatably engaging a strand of connected fasteners, means associated with said engaging means for causing the strand to move translationally with the second member in one direction, means associated with the frame for preventing translational movement of the strand in the opposite direction, means for causing reciprocal relative sliding movements of said first and second member and of said first member on the frame, and means limiting all of the said movements. The strand-engaging means preferably comprises a chuck of non-circular cross-section through which the forward end of the strand is adapted to project, the chuck being of such a length as to encompass at least the full length of a fastener and the head portion of the next fastener.

Other and further objects, features and advantages will be apparent from the description which follows, read in connection with the accompanying drawing in which:

FIGURE 1 is an elevational view, partly in section, and partly diagrammatic, of a semi-automatic device for applying fasteners according to the present invention;

FIGURE 2 is a horizontal section on line 2—2 of FIGURE 1;

FIGURE 3 is a fragmentary vertical axial section of the lower portion of the device illustrating in FIGURE 1;

FIGURES 4 and 5 are sectional views on lines 4—4 and 5—5, respectively, of FIGURE 3;

FIGURES 6, 7, 8 and 9 are elevational views of individual fasteners which may be used with the apparatus of the present invention, illustrating different suitable thread forms;

FIGURES 10, 11, 12, 13 and 14 are plan views of individual fasteners, illustrating optional peripheral head outlines;

FIGURES 15, 16, and 17 are plan views, respectively, of a pre-formed hole for receiving a fastener, the same hole with the shank of a fastener inserted therein, and the same hole and fastener shank after the latter has been rotated through 45°.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring first to FIGURE 1 for a view of a portion of a strand 20 of individual fasteners 21, it will be seen that the reduced end 22 of the shank portion of each fastener is connected to the head 23 of the adjacent fastener 21 by a relatively thin neck 24, which is frangible. To the foregoing extent the strand 20 is similar to the screw stick disclosed in United States Patent No. 2,247,499, but otherwise the strand of fasteners employed with the apparatus of the present invention differs notably from the aforesaid screw stick. The present strand of fasteners is preferably manufactured from a continuous wire of indefinite length and with the use of a multi-stage forging machine. The wire need not be rotated during its fabrication into a strand of fasteners and, therefore, may be of any desired length, and may be fed directly from a reel to the forming apparatus. The peripheral outline of the head portions 23 of the fasteners is imparted by suitable forming steps during fabrication of the wire or the strand, and is, likewise, the profile of the shank portion. The thread and flutes may, for example, be formed on the shank by rolling with suitable dies, the wire being permitted sufficient tortional flexure to allow for the necessary rotation of that portion undergoing thread formation at any particular moment. The expression "thread formation," as employed herein, does not, however, connote the formation of a continuous helical thread as in the case, for example, of the aforesaid screw stick of Patent No. 2,247,499, but refers to the formation of the interrupted circumferential ridges heretofore mentioned and illustrated in more detail in FIGURES 6–9, inclusive.

FIGURE 6 shows a fastener 21 the shank portion of which is provided with an interrupted helical V-type thread 25 the interruptions taking the form of flutes 26 which may be given a slight helical inclination as shown. For most applications, four such flutes may be used, and each of them may extend over an angle of 45°; that is to say, there may be four interrupted thread portions in each turn, spaced by four flutes equal to each other in angular extent and equal also in angular extent to the thread portions.

The fastener 27 of FIGURE 7 is provided with interrupted annular ridges 28 of V-form, spaced by axially directed flutes 29. In FIGURE 8 the fastener 30 is provided with interrupted annular ridges 31 of wedge-form, each said ridge having a surface 32 lying substantially normal to the axis of the fastener and a surface 33 lying at an acute angle to the surface 32. Such a formation, of course, provides increased resistance to axial withdrawal of the fastener from the work. In this embodiment the flutes 34 extend axially, as in the case of FIGURE 7.

FIGURE 9 illustrates a fastener adapted for use with harder material, both the circumferential ridges and the longitudinal flutes being fewer in number. In this case, the circumferential ridges take the form of a helical V-type thread 35 of high pitch, the turns of which are separated by flats 36. The threads are interrupted by two oppositely disposed axially directed flutes 37 which may be somewhat wider than in the other described forms. Thus, in rotating the fastener to fix it in the material, fewer threads are forced into the material than would otherwise be the case. The advantage flowing from this arrangement will be more readily understood after a description of the method of applying the fasteners, which is as follows.

The material or work into which the fasteners are to be inserted must first be provided with untapped holes of a diameter somewhat less than that of the crests of the circumferential ridges or threads and it may for example be only slightly larger than the root diameter of the ridges. The particular fastener selected is then driven into the hole in an axial movement during which the interrupted ridges or teeth perform an operation in the nature of a broaching cut, leaving ribs of undeformed material between the groups of ridges or teeth, corresponding to the flutes of the fastener. When full penetration has been effected and the undersurface of the head portion of the fastener is flush against the work, the fastener is then given a partial rotation, preferably equal to the angular width of a flute, whereby the ridges 25, 28, 31 or 35, as the case may be, perform a tapping operation upon the aforesaid ribs of work material which were heretofore undisturbed. The ridges of the fastener are thus firmly locked into the ribs of work material, securing the fastener in place and at the same time the neck 24, connecting the inserted fastener to the rest of the strand, is broken. That is, the force necessary to produce the aforesaid rotation of the inserted fastener is applied through the next fastener and the connecting neck and is sufficient, after the ridges have penetrated the ribs 42 to the desired extent, to cause the neck 24 to shear off. It will be appreciated that the thickness of the neck 24 must be proportioned to the strength of the metal stock from which the fastener strand is made, to the extent of desired rotation of the inserted fastener, and to the hardness of the material of the work, so that the neck will shear off when, but only when, the desired rotation of the inserted fastener has been achieved. This operation is illustrated in FIGURES 15–17 wherein FIGURE 15 shows the pre-formed, untapped hole 40 in the work material. In FIGURE 16 a fastener 21 has been forced into the hole leaving ribs 42, the material between the ribs 42 having been broached away and deposited at the bottom of the hole. In FIGURE 17 the fastener 21 has been rotated through 45° with the result that the ridges 25 have been forced into the ribs 42, locking the fastener into the hole somewhat in the manner of the familiar "bayonet joint" mode of attachment.

In the method just described, and which is claimed in my copending application Serial No. 806,109, filed April 13, 1959, the fastener illustrated in FIGURE 6 was employed, which fastener embodies flutes 26 which have a slight helical inclination. Therefore, during the axial movement of the fastener into the hole, the latter will execute a slight rotational movement as well, but this is of insufficient extent to cause breakage of the neck 24 connecting the fastener 21 to the next fastener in the strand. In the case of the fastener illustrated in FIGURES 7, 8 and 9, of course, since the flutes are axially directed, such slight rotational movement of the fastener, during its insertion into the work, will not occur.

The present invention resides in a semi-automatic device for applying fasteners of the character described above, which device is illustrated in FIGURES 1, 2 and 3. Referring to FIGURE 1, the device comprises a frame consisting of a base plate 50, vertical frame members 51 and 52, secured on the base 50, and a cross head 53 connecting the upper ends of the aforesaid vertical members. A cylinder 54 is slidably mounted between the members 51 and 52, the cylinder head 55 being provided with lugs 56 which engage grooves 57 and 57' formed in the members 51 and 52. Downward movement of the cylinder 54 is limited by contact between the head 58 and the base plate 50, while upward movement of the cylinder may be limited by means of an adjustable stop 59 in the groove 57'. The cross head 53 of the frame is provided with adjustable studs 60 each of which carries a seat 61 to which is attached one end of a helical spring 62. The other end of each spring 62 is secured to a boss 63 on the cylinder head 55. By adjusting the studs 60, the cylinder 54 may be given a bias either upwardly or downwardly, as may be required in any particular case.

A piston 65 is slidably mounted within the cylinder 54, and is secured on a piston rod 66 which extends outwardly through either end of the cylinder. The piston rod 66 is provided with a central bore of a diameter sufficient to accommodate a strand 20 of connected fasteners. The piston rod 66 carries, at its lower end, a chuck 67, seen in greater detail in FIGURES 3, 4 and 5, which chuck is spaced from the base plate 50 by a frusto-conical collar 68 secured to the plate 50. Upward movement of the piston rod 66 is, of course, limited by contact between the chuck 67 and the collar 68, but may be adjustably limited at a point short of such contact by means of an adjustable stop 69 carried by the piston rod 66 beneath the cross head 53 of the frame.

The upper cylinder head 55 carries a parti-cylindrical member 70 having a cam groove 71 while the piston rod 66 carries a cam follower 72 (FIGURE 2) which engages the cam groove 71. The cam follower 72 is secured on an arm 73 having an eye 74 which encircles the piston rod 66 and is adjustably fixed thereto in any suitable manner. As will be seen in FIGURE 1, the cam groove 71 extends, for a distance, parallel to the axis of the piston rod 66, and has a further portion which is given a helical inclination. Therefore, longitudinal movement of the cylinder 54 relative to piston 65, in a direction to cause the cam follower 72 to progress downwardly in the cam groove 71, produces no relative angular movement of such parts through a certain portion of such relative longitudinal movement, but when such relative longitudinal movement exceeds a predetermined extent, further relative longitudinal movement produces rotation of the piston rod 66 relative to the cylinder 54; and since the latter is prevented from rotating through its connection with the frame members 51 and 52, a rotation of the piston rod 66, relative to the frame, ensues.

Referring now to FIGURES 3, 4 and 5, it will be seen that the chuck 67 comprises a sleeve 75 secured to the lower end of the hollow piston rod 66 by means of a set screw 76, and a collar 77 secured within the sleeve 75 by means of a set screw 78, and abutting the lower end of piston rod 66. The collar 77 is provided with a through aperture having a cross-section similar to the peripheral outline of the fasteners with which it is to be used, and adapted to accommodate the same with just sufficient clearance to permit their ready passage therethrough in an axial direction. That is, the strand 20 is not rotatable relative to the collar 77 but, upon rotation of the latter, the fastener heads which, at the moment, lie within the collar 77 are positively engaged and given a rotary motion equal to that of the collar.

Both the sleeve 75 and the collar 77 are provided, at their lower ends, with oppositely disposed, aligned slots 79, 79' and 80, 80', respectively, to accommodate spring-pressed pawls 81, 81' carried by the sleeve 75. The pawls 81, 81' are adapted to engage behind the head of a fastener 21 and ensure downward movement of the strand 20 when the piston rod 66 is moved downwardly by force applied to the piston 65. A spring-pressed detent 82 is adapted to engage behind the head of an adjacent fastener 21 to prevent upward movement of the strand 20 when the piston rod 66 is moved upwardly by reason of force applied to the underside of piston 65. Both the pawls 81, 81' and the detent 82 are so shaped as to permit relative downward movement of the strand 20.

Referring now to FIGURE 1, it will be seen that the chamber 85 within the cylinder 54 and above the piston 65 is connected through conduit 86 to a first port of a multi-port valve 87 which, for example, may be solenoid operated. The valve 87 is connected through a conduit 88 with any suitable source of pressure fluid. The cylinder chamber 89 below the piston 65 is connected through a conduit 90 with a second port in the valve 87, which is also connected to exhaust through a port 91. Upon operation of the valve 87 to interconnect conduits 86 and 88, on the one hand, and conduit 90 and port 91 on the other hand, pressure fluid is admitted to cylinder chamber 85 and piston 65 is forced downwardly, carrying with it the piston rod 66. By this movement the endmost fastener 21 of the strand 20 is inserted in a pre-formed hole in the work until the undersurface of the head 23 is flush with the upper surface of the work. At this point, since the piston 65 cannot move further in a downwardly direction, the pressure in chamber 85 causes the cylinder 54 to move upwardly against the pressure (or with the aid of the tension, as the case may be) of springs 62. During the aforesaid downward movement of the piston rod 66, the cam follower 72 has traversed the axial portion of the cam groove 71 in the cam 70. Upward movement of the cylinder, of course, produces further relative movement between the cam and cam follower, during which the cam follower is caused to traverse part of the helically inclined portion of the cam groove 71, thus causing rotation of the piston rod 66. This rotation of piston rod 66 causes the ridges of the fastener, which has been inserted in the work, to penetrate the ribs of undisturbed work material as previously described, thus locking the fastener into the work, and at the same time, causes the neck 24 connecting the inserted fastener to the remainder of the strand to be severed by a twisting action, thus completing the operation of applying the fastener. The operator then reverses the position of the valve 87, by suitable operation of an electric switch or other means (not shown) connecting conduits 88 and 90 and connecting conduit 86 to port 91. This causes pressure fluid to be introduced into chamber 89 and connects chamber 85 to exhaust, whereupon cylinder 54 is moved downwardly against the base plate 50 and piston 65 is moved upwardly until the stop member 69 on the piston rod 66 engages the underside of cross head 53, when the apparatus will be in the condition illustrated in FIGURE 1, and is ready to repeat the operation of applying a fastener. The only rotation of the strand 20 which occurs during the applying operation is a minor rotation of that portion of the strand which is engaged within the collar 77. This results in a slight torsional flexure of an adjacent portion of the strand, which is easily taken up without damage to the necks 24 other than that connecting the inserted fastener to the next fastener.

Having thus described the invention, what is claimed as new and desired to be secured by Letters Patent is:

1. Apparatus for applying fasteners comprising a frame, a pressure-fluid cylinder slidable in said frame, a piston slidable in said cylinder, a piston rod fixed to and movable with said piston, said piston rod extending outwardly of said cylinder at both ends thereof and having a longitudinal bore for receiving an integral strand of individual fasteners, means at one end of said piston rod for engaging and advancing said strand with said piston rod upon movement of said piston rod in one direction, means carried by said frame for engaging and holding said strand upon movement of said piston rod in the opposite direction, means limiting the movements of said cylinder relative to said frame, a source of pressure fluid, and means for alternately connecting one of the respective ends of said cylinder to said source and simultaneously connecting the opposite end thereof to exhaust.

2. Apparatus as defined in claim 1, including interengaging means on said cylinder and said piston rod for causing rotation of said piston rod during a portion of the relative sliding movement of said piston rod and cylinder, means for preventing rotation of said cylinder relative to said frame, and chuck means carried by said piston rod and engaging a portion of said strand to prevent relative rotation therebetween.

3. Apparatus as defined in claim 2, said interengaging means including a cam follower on said piston rod and a cam on said cylinder.

4. Apparatus for applying fasteners comprising a frame, a first member slidable on said frame, a second member slidable within said first member and having limited rotation relative thereto during a portion of their relative sliding movement, means carried by said second member for non-rotatably engaging a strand of connected fasteners, and for causing said strand to move translationally with said second member in one direction, means carried by said frame for preventing translational movement of said strand in the opposite direction, means for causing relative sliding movements of said first and second members and of said first member on said frame, and means limiting all of said movements.

5. Apparatus as defined in claim 4, said strand engaging means including a chuck member having an aperture of non-circular cross-section for receiving and closely surrounding the head portions of the two forward fasteners of said strand, said apparatus including means for arresting the movement of said second member in said oppisite direction after the first of said two fasteners has been completely discharged from said aperture and while the head of the second of said two fasteners is still within said chuck member.

References Cited in the file of this patent

UNITED STATES PATENTS

| | | |
|---|---|---|
| 2,327,795 | Hutchison | Aug. 24, 1943 |
| 2,506,835 | Johnson | May 9, 1950 |
| 2,575,525 | Mitchell | Nov. 20, 1951 |
| 2,589,016 | Michatek | Mar. 11, 1952 |

FOREIGN PATENTS

| | | |
|---|---|---|
| 260,156 | Switzerland | July 16, 1949 |
| 280,747 | Switzerland | May 16, 1952 |
| 722,676 | Germany | July 16, 1942 |